United States Patent
Elzey et al.

(10) Patent No.: US 7,669,799 B2
(45) Date of Patent: Mar. 2, 2010

(54) REVERSIBLE SHAPE MEMORY MULTIFUNCTIONAL STRUCTURAL DESIGNS AND METHOD OF USING AND MAKING THE SAME

(75) Inventors: Dana M. Elzey, Charlottesville, VA (US); Haydn N. G. Wadley, Keswick, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 360 days.

(21) Appl. No.: 10/487,291

(22) PCT Filed: Aug. 26, 2002

(86) PCT No.: PCT/US02/27116

§ 371 (c)(1), (2), (4) Date: Feb. 20, 2004

(87) PCT Pub. No.: WO03/018853

PCT Pub. Date: Mar. 6, 2003

(65) Prior Publication Data

US 2004/0197519 A1    Oct. 7, 2004

Related U.S. Application Data

(60) Provisional application No. 60/314,619, filed on Aug. 24, 2001.

(51) Int. Cl.
    *B64C 3/20* (2006.01)
(52) U.S. Cl. .............. 244/123.12; 244/123.1; 244/133; 244/201; 244/219; 428/604; 428/686
(58) Field of Classification Search .............. 244/219, 244/123.1, 123.12, 133, 201; 428/604, 593, 428/116, 598, 686, 68; 29/897.32, 897.2
See application file for complete search history.

(56) References Cited

U.S. PATENT DOCUMENTS 4,129,089 A    12/1978    Paidoussis
4,518,444 A    5/1985    Albrecht et al.

(Continued)

FOREIGN PATENT DOCUMENTS

WO    WO 0227116 A1    4/2002

*Primary Examiner*—Andrew T Piziali
(74) *Attorney, Agent, or Firm*—Novak Druce DeLuca + Quigg LLP; Robert J. Decker

(57) ABSTRACT

A multifunctional member with a first active member (30), which is adapted to contract if exposed to a temperature above a first transition temperature range. A second active member (40), which is adapted to contract if exposed to a temperature above a second transition temperature range. A core member (20), which is adaptive for deformation. The first and second active members (30, 40) are attached on opposite or different sides of the core member (20). A heat source operatively connected to the first and second active members (30, 40) to expose them to transition temperatures. The first active member (30) contracts while above the first transition temperature range causing the second active member (40) to expand, wherein the second active member (40) is below the second transition temperature range. The second active member (40) contracts while above the second transition temperature range causing the first active member (30) to expand, wherein the first active member (30) is below the first transition temperature range.

12 Claims, 13 Drawing Sheets

U.S. PATENT DOCUMENTS

| | | | |
|---|---|---|---|
| 4,806,815 A | 2/1989 | Honma | |
| 4,864,824 A | 9/1989 | Gabriel et al. | |
| 4,881,981 A | 11/1989 | Thoma et al. | |
| 5,114,104 A * | 5/1992 | Cincotta et al. | 244/219 |
| 5,186,420 A * | 2/1993 | Beauchamp et al. | 244/219 |
| 5,242,321 A | 9/1993 | Gil | |
| 5,405,337 A | 4/1995 | Maynard | |
| 5,419,788 A | 5/1995 | Thoma et al. | |
| 5,442,914 A | 8/1995 | Otsuka | |
| 5,534,354 A * | 7/1996 | Gregg et al. | 428/593 |
| 5,536,126 A | 7/1996 | Gross | |
| 5,558,304 A | 9/1996 | Adams | |
| 5,594,330 A | 1/1997 | Jacobsen | |
| 5,597,378 A | 1/1997 | Jervis | |
| 5,641,955 A | 6/1997 | Bonniau et al. | |
| 5,662,294 A * | 9/1997 | Maclean et al. | 244/219 |
| 5,700,337 A | 12/1997 | Jacobs et al. | |
| 5,746,631 A | 5/1998 | McCarthy | |
| 5,882,444 A | 3/1999 | Flomenblit et al. | |
| 5,931,422 A | 8/1999 | Geiger et al. | |
| 5,934,952 A | 8/1999 | Scanlon | |
| 5,941,249 A | 8/1999 | Maynard | |
| 5,964,770 A | 10/1999 | Flomenblit et al. | |
| 6,004,330 A | 12/1999 | Middleman et al. | |
| 6,055,123 A | 4/2000 | Kazmierczak et al. | |
| 6,065,934 A | 5/2000 | Jacot et al. | |
| 6,084,849 A | 7/2000 | Durig et al. | |
| 6,126,371 A | 10/2000 | McCloskey | |
| 6,131,531 A | 10/2000 | McCanna et al. | |
| 6,133,547 A | 10/2000 | Maynard | |
| 6,138,604 A | 10/2000 | Anderson et al. | |
| 6,146,224 A | 11/2000 | McCarthy | |
| 6,149,742 A | 11/2000 | Carpenter et al. | |
| 6,170,202 B1 | 1/2001 | Davoodi et al. | |
| 6,182,929 B1 | 2/2001 | Martin et al. | |
| 6,209,824 B1 | 4/2001 | Canton et al. | |
| 6,217,567 B1 | 4/2001 | Zadno-Azizi et al. | |
| 6,220,550 B1 | 4/2001 | McKillip, Jr. | |
| 6,258,118 B1 | 7/2001 | Baum et al. | |
| 6,260,567 B1 | 7/2001 | Gruensfelder et al. | |
| 6,278,084 B1 | 8/2001 | Maynard | |
| 6,293,090 B1 | 9/2001 | Olson | |
| 6,299,613 B1 | 10/2001 | Ogilvie et al. | |
| 6,306,141 B1 | 10/2001 | Jervis | |
| 6,318,070 B1 | 11/2001 | Rey et al. | |
| 6,345,792 B2 | 2/2002 | Bilanin et al. | |
| 6,348,067 B1 | 2/2002 | Baum et al. | |
| 6,371,821 B1 | 4/2002 | McCarthy | |
| 6,384,707 B2 | 5/2002 | Minners | |
| 6,395,018 B1 | 5/2002 | Castaneda | |
| 6,402,906 B1 | 6/2002 | Pichulo et al. | |
| 6,409,749 B1 | 6/2002 | Maynard | |
| 6,417,597 B1 | 7/2002 | Baker, Jr. | |
| 6,419,358 B1 | 7/2002 | Schetky et al. | |
| 6,422,010 B1 | 7/2002 | Julien | |
| 6,425,343 B1 | 7/2002 | Akers et al. | |
| 6,425,829 B1 | 7/2002 | Julien | |
| 6,427,712 B1 | 8/2002 | Ashurst | |
| 6,427,948 B1 | 8/2002 | Campbell | |
| 6,432,134 B1 | 8/2002 | Anson et al. | |

* cited by examiner

KNITTING 62

BRAIDING 63

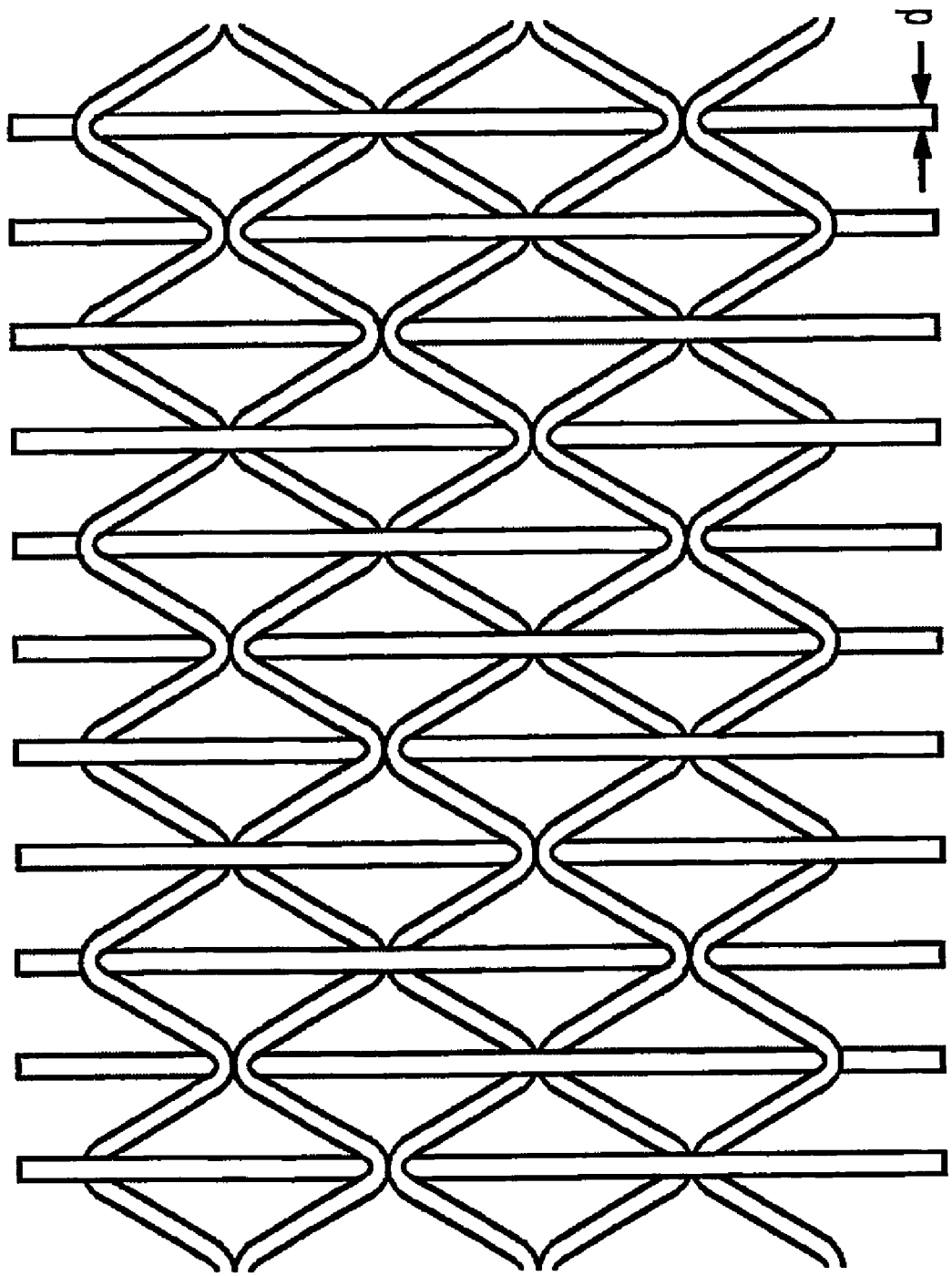

| DIMENSION \ AXIS | 0 NON-AXIAL | 1 MONO-AXIAL | 2 BIAXIAL | 3 TRIAXIAL | 4~ MULTI-AXIAL |
|---|---|---|---|---|---|
| 1D | | ROVING-YARN | | | |
| 2D | CHOPPED STRAND MAT | PREIMPREG-NATION SHEET | PLANE WEAVE 65 | TRIAXIAL WEAVE 64 | MULTI-AXIAL WEAVE, KNIT |
| 3D LINEAR ELEMENT | (X,Y,Z fibers) | 3D BRAID 67 | MULTI-PLY WEAVE 68 | TRIAXIAL 3-D WEAVE 69 | (MULTI-AXIAL 3-D WEAVE) 4)~n, 12)~14) 70 |
| 3D PLANE ELEMENT | (X,Y,Z plates) | LAMINATE TYPE | H OR I BEAM 71 | HONEY-COMB TYPE 72 | |

REVERSIBLE SHAPE MEMORY MULTIFUNCTIONAL STRUCTURAL DESIGNS AND METHOD OF USING AND MAKING THE SAME

RELATED APPLICATIONS

This application is a national stage filing of International Application No. PCT/US02/27116, filed on Aug. 26, 2002, which claims benefit under 35 U.S.C. Section 119(e) from U.S. Provisional Application Ser. No. 60/314,619, filed on Aug. 24, 2001, entitled "Reversible Shape Memory Actuator Panels and Method of Manufacturing the Same," the entire disclosures of which are hereby incorporated by reference herein.

FIELD OF INVENTION

The present invention relates generally to reversible shape memory actuators, and more particularly to reversible shape memory multifunctional structures and related methods of using and manufacturing the same.

BACKGROUND OF THE INVENTION

Shape memory alloys (SMA) are a class of metallic materials, which undergo a reversible, diffusionless phase transformation. Roughly equiatomic Ni—Ti alloys are probably the most well known of these shape memory alloys. They are used in a wide variety of applications, including medical applications, such as stents used to hold blocked arterial passages open, heat sensing valves, robotic manipulators and undersea pipeline couplings. The mechanism by which these alloys appear able to remember and return to their original state prior to deformation is now reasonably well understood. At low temperature, martensite is the stable phase and will form spontaneously when cooled to a sufficiently low temperature. At high temperature, the austenite phase is stable and will form upon heating. When deformed beyond the elastic limit at intermediate temperatures, deformation occurs not by dislocation generation and motion, but rather by a series of small displacements on the atomic scale leading to the formation of stress-induced martensite. Upon heating to a sufficiently high temperature, the martensite reverts back to the parent austenite structure, leading to a reversal of the inelastic deformation and consequently, a return to the sample's original size and shape. This cycle of inelastic deformation at low temperature caused by some externally applied force, followed by reversion to austenite and the component's original shape upon heating is known as the one-way shape memory effect. The cycle can be repeated many times, depending on the extent of the deformation imposed per cycle. Deformations as high as eight percent are commonly reported for nickel titanium SMA's. Other SM materials are also emerging with larger strain capabilities and/or different use temperatures. Some utilize magnetic fields to effect shape recovery.

Ni—Ti SMA's can also be subjected to a thermomechanical treatment allowing them to exhibit a two-way effect in which one shape is obtained upon cooling and another predetermined shape upon heating. The two-way effect is more limited however, to smaller recoverable strains, a lower number of cycles over which the effect is undergraded, and by the very low (subfreezing) temperatures typically needed to complete the low-temperature shape change.

Nickel titanium alloys that exhibit the SMA have attracted interest as actuators for distorting the shape of structures in a controllable way. Such structures are known as smart or intelligent structures. In addition to SMA-actuated structures, other types of actuators have been used, including pneumatic or hydraulic pressure, piezoelectric thin films and materials whose large coefficient of thermal expansion causes them to undergo relatively large strains during heating and cooling.

Reversible shape distortions can be achieved by using pairs of opposing pneumatic or hydraulic actuators working antagonistically. Efforts to achieve this with SMAs has been more problematic. Current reversible devices achieve their reversibility from the use of a some e sort of biasing element. That is, an elastic spring or tendon or some other elastic restoring agent that acts against the shape memory alloy is needed since typically once the shape memory alloy is allowed to cool it will not otherwise revert back to its original position. Accordingly, a biasing applies an opposing force to the SMA force. This is clearly undesirable since the actuators out put work is split into the work to change the shape of the structure and the work supplied to the bias element. An advantage of the present invention shape memory multifunctional structure is that it does not require any bias element. For example, neither springs or other elastic restoring devices are required. Because more of the available work is available to distort the structures, a smaller actuator can be used and therefore the mass of the system proposed here can therefore be less than that of competing concepts.

Lu et al. (See Lu, T. J., Hutchinson, J. W. and Evans, A. G., "Optimal design of a flexural actuator", J. Mech. Phys. Solids 49 (2001), 2071-2093) discusses a shape-changing sandwich panel in which a metallic or polymer truss core is placed between shape memory alloy face sheets, which are integrally bonded to the core. However, the core does not exhibit any shape memory effect and consists of a single layer of triangular cells whose areas are defined by the (straight) truss members and the Lu et al. panel is reversible through a two-way shape memory effect only. Whereas the present invention shape memory multifunctional structure provides an actuating sandwich panel capable of fully reversing its change in shape to return to its initial configuration by virtue of SMA face sheets exploiting a one-way shape memory effect only.

Therefore, there is a need in the art for a reversible shape memory structure that has a way of sensing or responding to some stimulus or change in its environment as well as satisfy structural demands of the given application with minimal use of material. Such a material is bi-functional (i.e. it supports loads and changes shape). It is an example of a new class of so called multifunctional materials.

SUMMARY OF THE INVENTION

The present invention provides reversible shape memory multifunctional structures and the related methods of using and manufacturing the same. The present invention multifunctional structure provides a desired structure, e.g., structural sandwich panel, that is able to undergo a reversible change in shape without any external or bias forces required to complete the full cycle of shape change.

The shape change may be effected by a shape memory material such as a shape memory alloys (SMAs), magnetic shape memory alloys, shape memory polymers, and other analogous shape memory materials that may be discovered. The present invention describes the use of heat to stimulate shape recovery but others such as electric or magnetic fields could be used. All that is required is that upon activation, the materials transform into their contracted or shortened state. Furthermore, the actuator shape memory panel achieves a fully reversible shape change requiring the one-way shape memory effect only. This is accomplished by a unique core design which, when one of the two face sheets is stimulated and thus undergoes a length change, the stimulated face sheet in turn forces the opposite (un-stimulated) face sheet to deform in tension. By alternately stimulating one face sheet and then the other, the sandwich beam or panel is able to perform fully reversible cyclic shape changes. The performance of the sandwich panel, in terms of available power, actuating frequency, peak load bearing capacity, stiffness, weight, manufacturing cost, etc., can be optimized by proper selection of face sheet alloy, thickness, overall core thickness, core member thickness and length, and the design of the joint(s) connecting core member and face sheet.

In one embodiment, the shape change is effected by a shape memory alloy (SMA), such as a Ni—Ti-base SMA. Furthermore, the actuator SMA panel achieves a fully reversible shape change requiring the one-way shape memory effect. This is accomplished by a unique core design which, when one of the two face sheets is heated and thus undergoes a length change, which in turn forces the opposite (unheated) face sheet to deform in tension. By alternately heating one face sheet and then the other, the sandwich beam or panel is able to perform fully reversible cyclic shape changes. The performance of the sandwich panel, in terms of available power, actuating frequency, peak load bearing capacity, stiffness, weight, low manufacturing cost, etc., can be optimized by proper selection of face sheet alloy, thickness, overall core thickness, core member thickness and length, and the design of the joint connecting core member and face sheet.

In another aspect, the present invention features a multifunctional member adapted for structural deformation, the multifunctional member comprising:

a first active member, said first active member adapted to contract if exposed to a temperature above a first transition temperature range;

a second active member, said second active member adapted to contract if exposed to a temperature above a second transition temperature range;

at least one core member, wherein said first and second active members are connected to opposite sides of said core member;

at least one heat source operatively connected to said first and second active members to expose said first and second active members to said first and second transition temperatures, respectively;

wherein said first and second active members are operable to alter the shape of the multifunctional member, wherein:

said first active member contracts while above said first transition temperature range causing said second active member to expand wherein said second active member is below said second transition temperature range; and said second active member contracts while above said second transition temperature range causing said first active member to expand wherein said first active member is below said first transition temperature.

In another aspect the present invention features a method of manufacturing a multifunctional member adapted for structural deformation, the method comprising:

providing a core member adaptive for deformation;

providing a first active member and a second active member, said first active member and second active member adapted to contract if exposed to a first transition temperature range and second transition temperature range, respectively;

heating said first and second active members above said first and second active transition temperature ranges, respectively cooling said first and second active members below said first and second active transition temperature ranges, respectively pre-stretching said first active member and second active member while said first active member and second active member are below said first and second active temperature ranges, respectively;

attaching said first and second active members on opposite sides of said core member;

heating said first active member above said first active temperature range causing said first active member to contract, wherein;

said first member contraction causes said second active member to expand, wherein said second member is below said second transition temperature range;

cooling said first active member, wherein said first active member remains in contracted position; and heating said second active member above said second active temperature range causing said second active member to contract, wherein said second member contraction causes said first active member to expand, wherein said first active member is below said first transition temperature range.

In still another feature the present invention features a method of manufacturing a multifunctional member adapted for structural deformation, the method comprising:

providing a first active member and a second active member, said first active member and second active member adapted to contract if exposed to a first transition temperature range and second temperature range, respectively;

heating said first active member above said first active temperature range causing said first active member to contract, cooling said first active member, wherein said first active member remains in contracted position;

deforming a core to be adaptable for attachment to said contracted first active member;

attaching said deformed core onto said contracted first active member;

heating said second active member above said second active temperature range causing said second active member to contract;

cooling said second active member, wherein said second active member remains in contracted position;

additionally deforming said contracted first active member and deformed core into a shape substantially similar to said contracted second active member so as to be adaptable for attachment to said contracted second active member; and attaching said additionally deformed core onto said contracted second active member opposite side of said first active member.

Moreover, in another aspect of the invention features a method of transforming a multifunctional member comprising the steps:

a) providing a first active member and a second active member, said first active member and second active member adapted to contract if exposed to a temperature above a first transition temperature range and second temperature range, respectively;

b) providing a core attached between said first and second active members, said core member adaptive for deformation;

c) heating at least a portion of said first active member above said first active temperature range causing at least a portion of said first active member to contract, wherein;

said at least portion of said first member contraction causes said at least a portion of said second active member to expand wherein said portion of said second active member is below said second transition temperature range;

d) cooling said heated portion of said first active member;

e) heating at least a portion of said second active member above said second active temperature range causing at least a portion of said second active member to contract, wherein;

said at least portion of said second member contraction causes said at least a portion of said first active member to expand wherein said portion of said first active member is below said first transition temperature range; and f) cooling said heated portion of said second active member.

Still yet another feature of the invention features a multifunctional member adapted for structural deformation, the multifunctional member comprising:

a first active member, said first active member adapted to contract if exposed to a first stimulant that shortens said first active member into a shortened state;

a second active member, said second active member adapted to contract if exposed to a second stimulant that shortens said second active member into a shortened state;

at least one core member, wherein said first and second active members are connected to substantially opposite sides of said core member;

said first and second stimulants operatively connected to said first and second active members to expose said first and second active members to said first and second stimulants, respectively;

wherein said first and second active members are operable to alter the shape of the multifunctional member, wherein:

said first active member contracts if stimulated by said first stimulant causing said second active member to expand while second active member is in non-stimulated state; and said second active member contracts if stimulated by said second stimulant causing said first active member to expand while said first active member is in non-stimulated state.

In addition, the present invention features a method of manufacturing a multifunctional member adapted for structural deformation, the method comprising:

providing a core member adaptive for deformation;

providing a first active member and a second active member, said first active member and second active member adapted to contract if exposed to a first stimulant and second stimulant, respectively, that shortens said first and second active members;

stimulating said first and second active members into first and second stimulating states, respectively;

allow first and second active members to return to non-stimulated states;

pre-stretching said first active member and second active member while said first active member and second active member are not in stimulated states;

attaching said first and second active members on opposite sides of said core member;

stimulating said first active member causing said first active member to contract, wherein:

said first member contraction causes said second active member to expand while said second member is in non-stimulated state, and then allow said first active member to return to non-stimulated state, wherein said first active member remains in contracted position; and stimulating said second active member causing said second active member to contract, wherein:

said second member contraction causes said first active member to expand while said first member is in non-stimulated state.

Also, the present invention features a method of manufacturing a multifunctional member adapted for structural deformation, the method comprising:

providing a first active member and a second active member, said first active member and second active member adapted to contract if exposed to a first stimulant temperature range and second stimulant, respectively;

stimulating said first active member causing said first active member to contract;

allowing said first active member to return to non-stimulated state, wherein said first active member remains in contracted position;

deforming a core to be adaptable for attachment to said contracted first active member;

attaching said deformed core onto said contracted first active member;

stimulating said second active member causing said second active member to contract;

allowing said second active member, to return to non-stimulated state, wherein said second active member remains in contracted position;

additionally deforming said contracted first active member and deformed core into a shape substantially similar to said contracted second active member so as to be adaptable for attachment to said contracted second active member; and attaching said additionally deformed core onto said contracted second active member opposite side of said first active member.

Further yet the present invention features a method of transforming a multifunctional member comprising the steps:

a) providing a first active member and a second active member, said first active member and second active member adapted to contract if exposed to a first stimulant and second stimulant, respectively;

b) providing a core attached between said first and second active members, said core member adaptive for deformation;

c) stimulating at least a portion of said first active member causing at least a portion of said first active member to contract, wherein;

said at least portion of said first member contraction causes said at least a portion of said second active member to expand wherein said portion of said second active member is in non-stimulated state;

d) allowing said stimulated portion of said first active member to return to non-stimulated state;

e) stimulating at least a portion of said second active member causing at least a portion of said second active member to contract, wherein;

said at least portion of said second member contraction causes said at least a portion of said first active member to expand wherein said portion of said first active member is in non-stimulated state; and f) allowing said stimulated portion of said second active member to return to non-stimulated state.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIGS. 11A-E show a schematic representation of some non-limiting examples of cellular structures for the core.

DETAILED DESCRIPTION OF THE INVENTION

Figure 1:
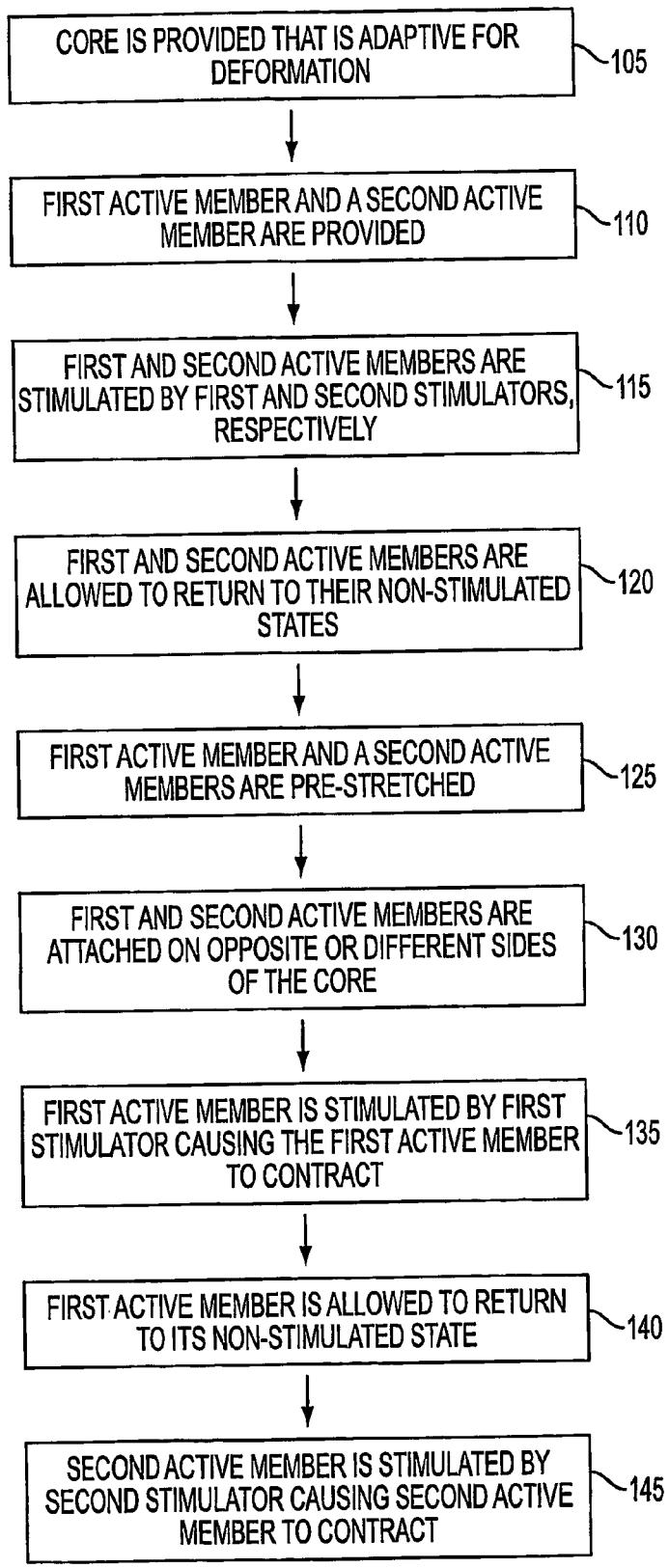
FIGS. 1-4 provide flowcharts for illustrative methods of making the present invention device.

Referring to FIG. 1, FIG. 1 illustrates an embodiment of the present invention method for manufacturing the reversible shape memory multifunctional structure. Although these steps are illustrated in a particular order in the flowchart of FIG. 1, the steps may be performed in various orders and/or with modified procedures or structures suitable to a given application. In step 105, a core is provided that is adaptive for deformation. In step 110, a first active member and a second active member are provided. In step 115, a first and second active members are stimulated by first and second stimulators, respectively. In step 120, the first and second active members are allowed to return to their non-stimulated states. In step 125, the first active member and second active members are pre-stretched. In step 130, the first and second active members are attached on opposite or different sides of the core. In step 135, the first active member is stimulated by first stimulator causing the first active member to contract to its shortened state. In step 140, the first active member is allowed to return to its non-stimulated state. In step 145, the second active member is stimulated by second stimulator causing second active member to contract, which in turn causes first active member to extend in tension.

Figure 2:
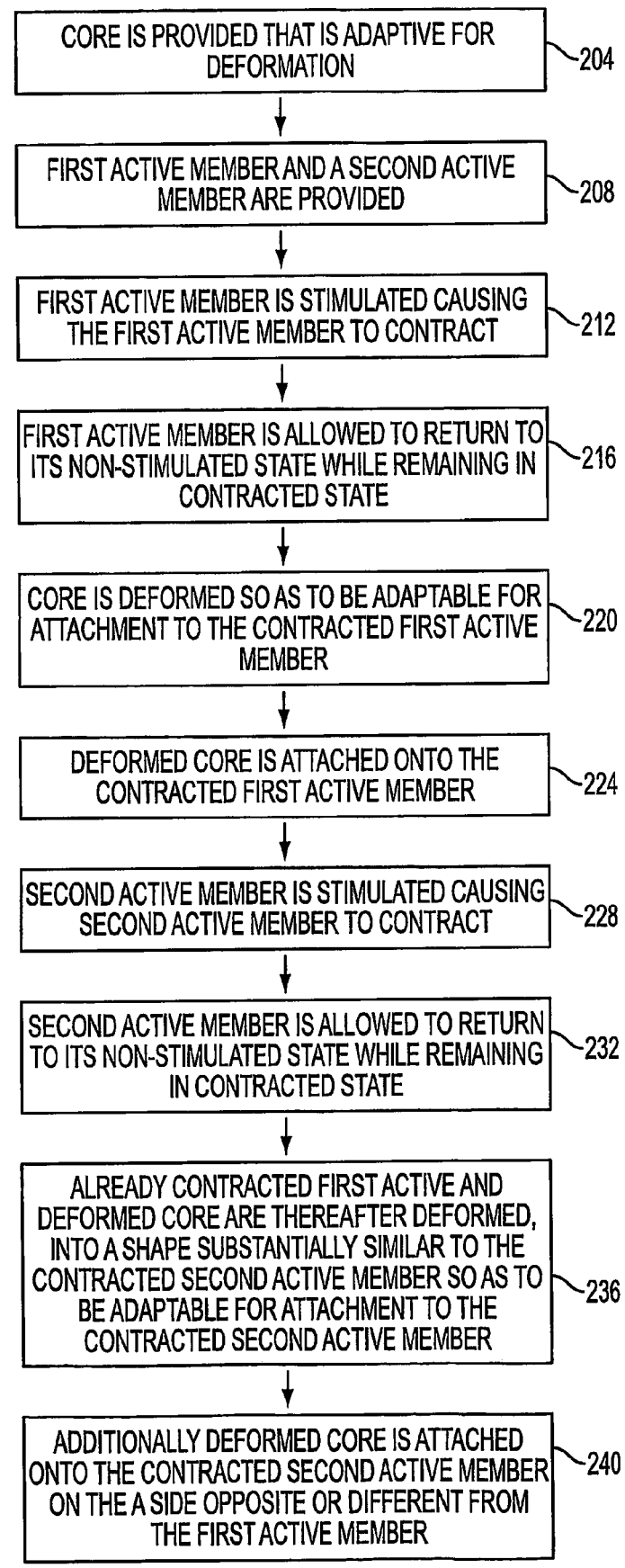

Referring to FIG. 2, FIG. 2 illustrates another embodiment of the present invention method for manufacturing the reversible shape memory multifunctional structure. Although these steps are illustrated in a particular order in the flowchart of FIG. 2, the steps may be performed in various orders and/or with modified procedures or structures suitable to a given application. In a step 204, a core is provided that is adaptive for deformation. In step, 208, a first active member and second active member are provided. In step 212, the first active member is stimulated causing the first active member to contract into its shortened state. In step 216, the first active member is allowed to return to its non-stimulated state while remaining in contracted state. In step 220, the core is deformed so as to be adaptable for attachment to the contracted, shortened, first active member. In step 224, the deformed core is attached onto the contracted, shortened, first active member. In step 228, the second active member is stimulated causing second active member to contract. In step 232, the second active member is allowed to return to its non-stimulated state while remaining in contracted state or shortened state. In step 236, the already contracted first active and deformed core are thereafter deformed, into a shape substantially similar to the contracted second active member so as to be adaptable for attachment to the contracted, shortened, second active member. In step 240, the additionally deformed core is attached onto the contracted second active member on a side opposite or different from the first active member.

Figure 3:
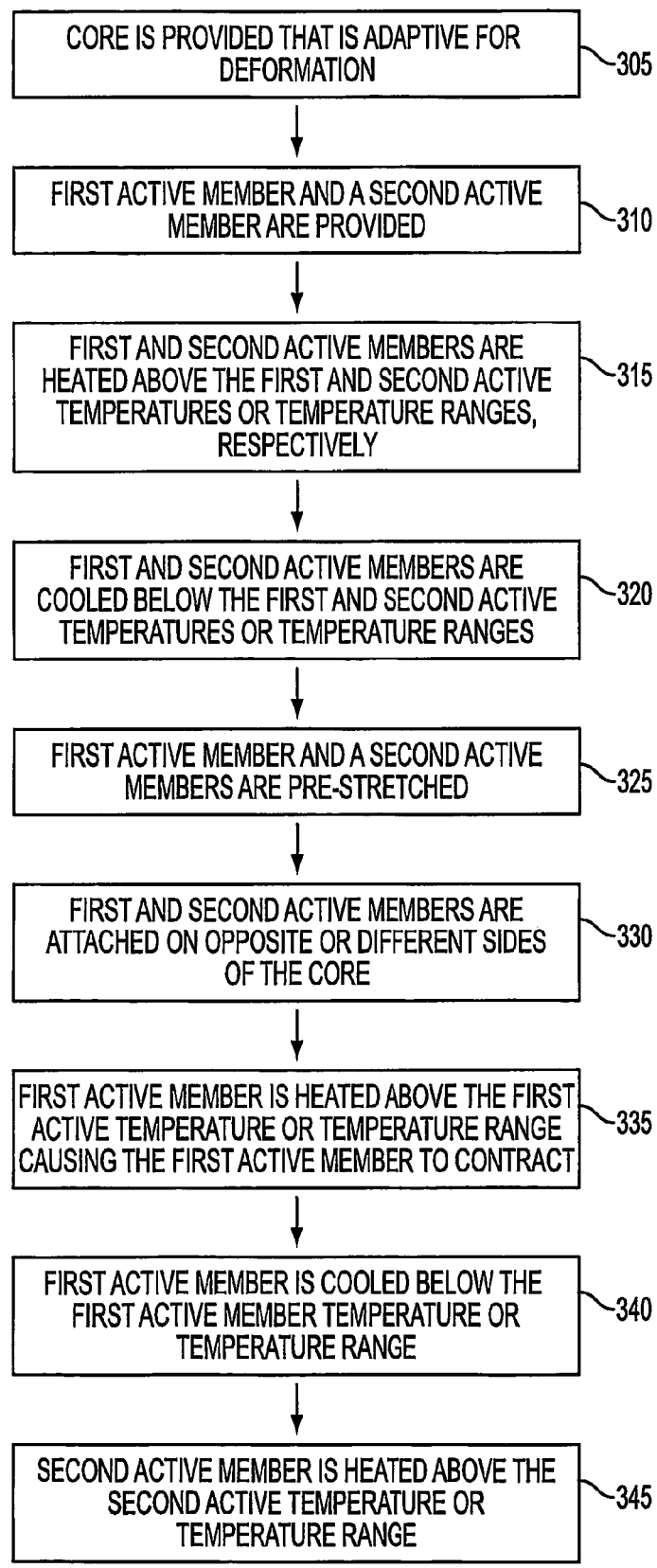
Figure 5A:
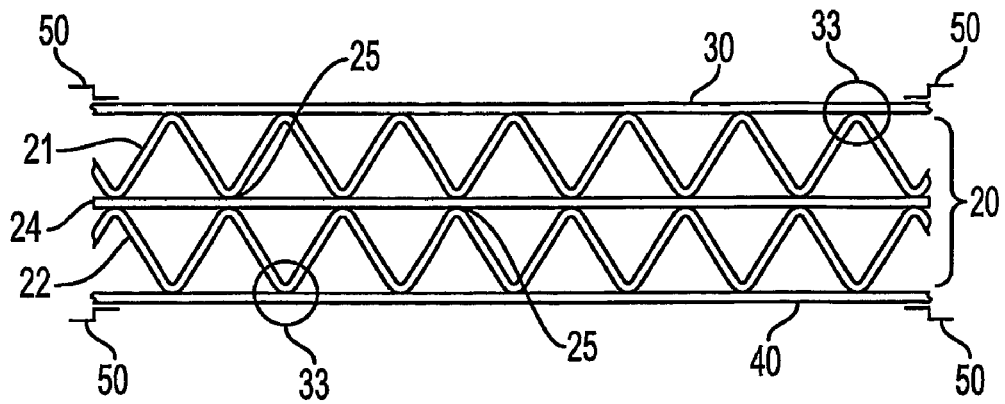
FIGS. 5A-5C are schematic representations of an embodiment the present reversible shape memory multifunctional structure.
Figure 5B:
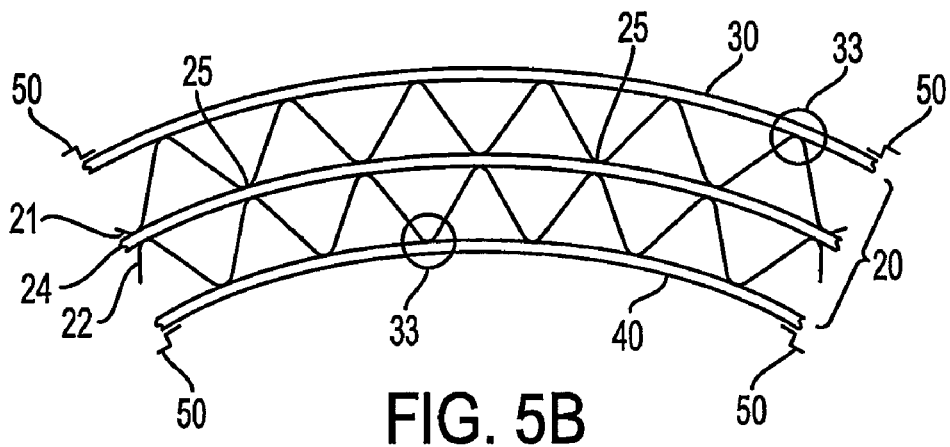
Figure 5C:
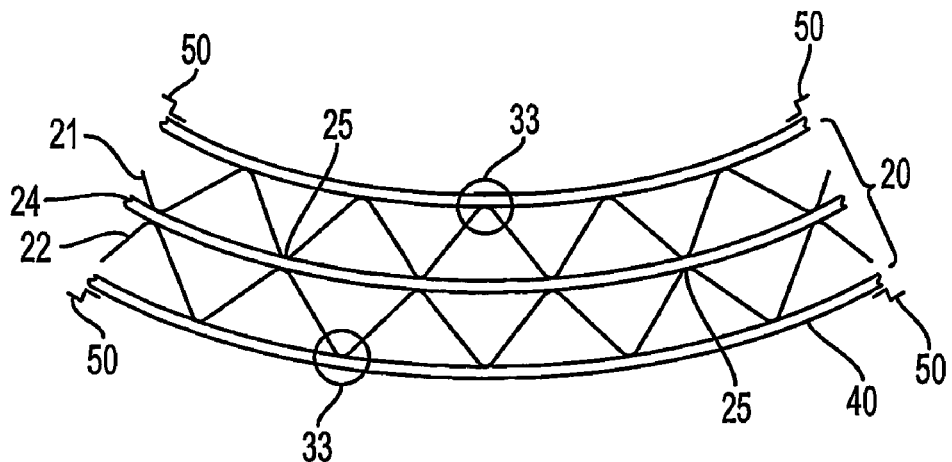
Figure 6A:
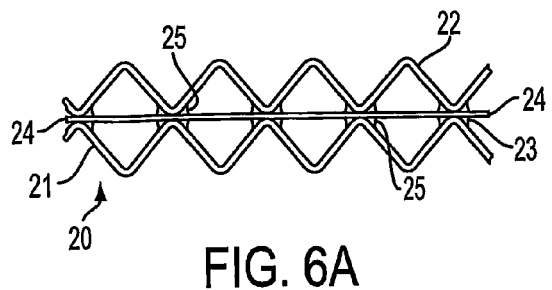
FIGS. 6A-6F are schematic representations of an embodiment the present reversible shape memory multifunctional structure.
Figure 6B:
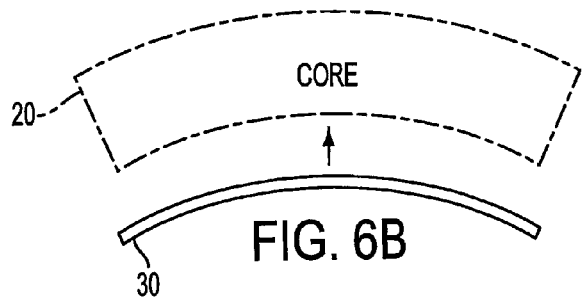
Figure 6C:
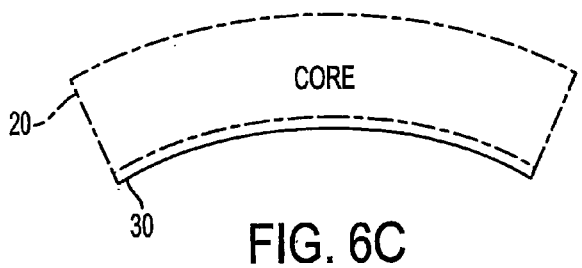
Figure 6D:
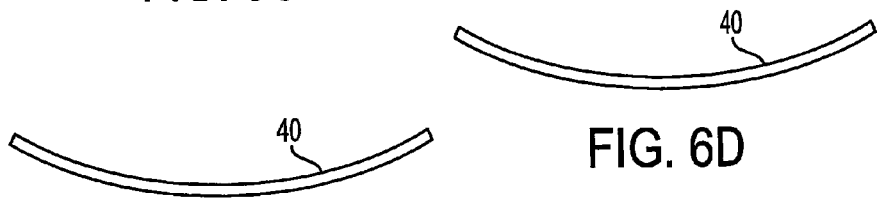
Figure 6E:
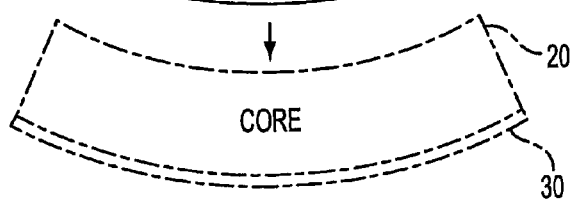
Figure 6F:
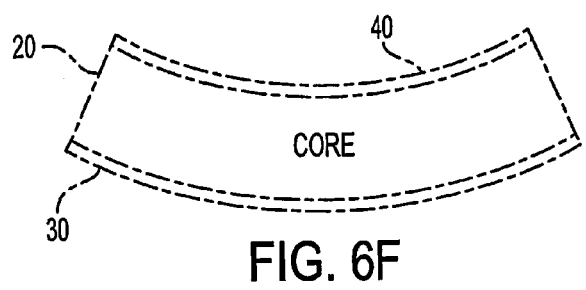

Referring to FIGS. 3 and 5, FIG. 3 illustrates an embodiment of the present invention method for manufacturing the reversible shape memory multifunctional structure and FIG. 5 schematically illustrates the structure produced therefrom. Although these steps are illustrated in a particular order in the flowchart of FIG. 3, the steps may be performed in various orders and/or with modified procedures or structures suitable to a given application. In a step 305, a core 20 is provided that is adaptive for deformation 305. In step 310, a first active member 30 and a second active member 40 are provided. The first and second active members 30, 40 are comprised of shape memory alloys or other shape memory materials that are adapted to contract if exposed to a first transition temperature range and second temperature range, respectively. In step 315, the first active member 30 and second active member 40 are heated above their first and second active temperatures or temperature ranges, respectively. In a step 320, the first active member 30 and second active member 40 are allowed to cool below their first and second active temperatures or temperature ranges, respectively. In a step 325, the first active member 30 and second active member 40 are pre-stretched while the first active member and second active member are below their first and second active temperatures or temperature ranges, respectively. The members are pre-strained at a desired level, such as approximately a fifty percent pre-strain range of their total available shape memory, or any other level as determined on a case by case basis. In a step 330, the first and second active members 30, 40 are attached on opposite or different sides of the core 20, as shown in FIG. 5A. In a step 335, the first active member 30 is heated above the first active temperature or temperature range causing the first active member 30 to contract into its shortened or contracted state. For instance, in a substantially concave like manner or shape as shown in FIG. 5B. Accordingly, the contraction causes the core 20 to deform and the second active member 40 to expand in tension in a convex like manner or shape, for instance, as shown in FIG. 5B. The contraction of the first active member 30 occurs essentially while the second member 40 is below the second transition temperature and/or temperature range, i.e., while in a non-stimulated state (non-contracted, or non-shortened state). In a step 340, the first active member 30 is cooled wherein the first active member 30 remains in contracted position or shortened state. In a step 345, the second active member 40 is heated above the second active temperature or temperature range causing the second active member 40 to contract into its shortened or contracted state. For instance, in a substantially concave like manner or shape as shown in FIG. 5C. Accordingly, the contraction causes the core 20 to deform in an opposite direction and the first active member 30 to expand in a convex like manner or shape, for instance, as shown in FIG. 5C. The contraction of the second active member 40 occurs essentially while the first member 30 is below the first transition temperature and/or temperature range, i.e., while in a non-stimulated state (non-contracted, or non-shortened state). The temperature ranges may be, for example, about 0 to about 170° C., about 20 to about 120° C., or about 50 to about 70° C. The temperature ranges using SMA actuators are only limited by that of the martensitic and austenitic transformations of the actuator materials. The potential exists to achieve actuation at temperatures as low as −200° C. and above 1000° C. Still referring to FIGS. 3 and 5, a suggested alternative embodiment to be followed in manufacturing the reversible SMA 1 is further provided. First, an inactive core 20 is constructed. That is, it's constructed of conventional materials, which are designed to deform elastically only. The core 20 may be made of various materials such as an austenitic stainless steel (e.g. Type 304) or other materials as appreciated by those skilled in the art. In one approach, a couple of long thin strips may be cut out of a sheet of stainless steel material. The core may have a bridge truss configuration and its thickness of its overall size and components are selected whereby the core elements or truss elements will not buckle during the operation of the actuator 1. Accordingly, the thickness is a design variable and material type is as well. Different materials may be chosen according to their different mechanical properties. The core 20, being an inactive material, may be constructed out of a variety of materials such as conventional alloys, plastics, even ceramics if they have enough elastic deformability. As mentioned above, in one preferred embodiment, Type 304 stainless steel is utilized.

Next, strips from the stainless steel sheets are provided and then the strips are corrugated, into corrugated strips 21, 22. The two corrugated strips 21, 22 are bonded to a flat center 24 sheet there between at one or more bonds 25. This center sheet 22 may also be constructed of stainless steel or other suitable materials. It may be of the same thickness as the two corrugated sheets 21, 22. The corrugated sheets 21, 22 may be bonded or connected to the center face sheet in a variety of ways as appreciated by those skilled in the art so as to get a satisfactory bond or connection. For instance, in one embodiment liquid phase sintering technique is utilized. Other embodiments include brazing, UV welding, laser welding, diffusion bonding, or the like.

Still referring to FIGS. 3 and 5, both of the face sheets 30, 40 should be heated first to ensure that they are in the austenite condition, and the heating will be to a temperature to above the so called austenite finish temperature. That's the characteristic temperature to insure that all of the shape memory alloy has reverted to the austenite phase, i.e. the high temperature phase. Typically, this is approximately in the range of about 50 to about 100° C. in the case of Ni—Ti SMA's. This relatively low temperature avoids expending excessive levels of energy for heating. Other transformation temperature ranges may be effected by selecting the alloy composition as required by the intended application, e.g., an optimal temperature range can be chosen by selecting the appropriate actuator material.

Once the face sheets 30, 40 go above this characteristic austenite finish temperature and are therefore entirely austenite, the sheets 30, 40 are subjected to a tensile testing machine, jig, or some other device for applying a pre-stretch, i.e., a strain to the shape memory alloy. In one embodiment, approximately a four percent tensile strain is applied to the face sheets 30, 40 before attaching them to the core 20. The amount of pre-stretch is a design variable. Depending on the anticipated total available shape memory strain, roughly half of that value of the anticipated total available shape memory is applied during pre-stretching. Alternatively, if desired, the pre-stretch may be selected to be greater than or less than half. As another example, if a total of six percent shape memory strain in the materials is desired, then the applied pre-strain of about half that amount would be three percent. In the instant embodiment, the faces were stretched to four percent because roughly eight percent shape memory strain was desired.

Still referring to FIGS. 3 and 5, thin sheets of Ni—Ti shape memory alloy 30, 40 are then bonded or mechanically fastened to the core 20. As will be discussed later, various bonding, attaching or adhesive means may be used as shown by reference number 33. For example, small threaded fasteners may be used to attach the active face sheets 30, 40 to the inactive stainless steel core 20. The sheets 30, 40 are attached to the core 20 using available metallurgical bonding techniques, as known to those skilled in the art, for attaching Ni—Ti shape memory alloy or other conventional alloys such as Ti, Ni or ferrous alloys. In the instant embodiment mechanical fastening arrangements are utilized. Holes are drilled through the SMA face sheet 30, 40 and corresponding, or matching set of holes in the core 20. As such, threaded fasteners such as bolt and nut pairs can be used to attach the face sheets 30, 40 to the core 20.

Next the top face sheet 30 is heated. It should be noted that the pre-straining of the face sheets 30, 40 induces martinsite to form as they were stretched. In turn, that martinsite is then ready to be reverted to austenite once face sheets 30, 40 are heated. Accordingly, the material, in a sense, remembers its austenitic shape, which is four percent shorter as experienced by the stretch provided in the tensile machine. As such, as the top face sheet 30 is heated up it starts shrinking in the length direction. So as the top face sheet 30 is shortening, the whole structure 1 is going to bend in an upwardly curve, or concave up configuration. If it were a structure or beam that was fixed in a vice at one end, so that you have a cantilever arrangement, the free end would be bending upward.

Once the top face sheet is heated 30 so that this structure 1 or beam element gets this upward curvature, or upward displacement of the free end, if heating is halted and substantially everything is allowed to cool down, the faces sheet 30 and remaining components of the structure 1 remains in the deformed configuration.

This holding ability is in contrast to the conventional art having bias driven actuators which have some sort of elastic restoring force that begins to reverse the shape as soon as the device is allowed to cool or is no longer stimulated. For conventional designs, in order to maintain a curved austenitic form shape, the heat must be sustained, otherwise the conventional SMA will spontaneously revert to its alternative shape, its low temperature shape. Accordingly, this illustrates one of the advantages of the present invention. That is, once the present invention device gets into either one of its fixed end states (or stimulated state), it will remain in that end state as long as necessary without an additional investment of energy.

Another advantage of the present invention device and method is that no elastic energy is stored in the device while its changing its shape as its heated or stimulated, although some energy is invested while deformation takes place in the low temperature face sheet.

Still referring to FIGS. 3 and 5, as the top face sheet 30 is heated, a resultant tensile force to the bottom face sheet 40 is exerted in order to stretch it further. Because while the top face sheet 30 is contracting, and the whole beam is bending upward, or paneling, the bottom face 40 sheet has to be stretched. The reason half of the shape memory strain is put into the face sheets during the pre-stretching operation is so that there is still half of the shape memory capability to invest in that low temperature face sheet while the top face sheet is being heated. So that bottom face sheet, which had a four percent pre-strain will now have eight percent strain in the end state. When the top face sheet 30 is heated into the austenite shape, it contracts four percent, it induces an additional four percent in the bottom face sheet 40. Consequently, there is a four percent pre-strain in the bottom sheet 40, plus four additional. Thereby a total of eight percent is provided in bottom face sheet 40. Top face sheet 30 is back to zero, and the bottom face sheet has its full eight percent, i.e., pre-strain plus four percent active.

Now that the top face sheet 30 has been allowed to cool, the bottom face sheet 40 is ready to be heated or stimulated. As can be recalled, the bottom sheet 40 has eight percent strain, its limiting shape memory strain. Now when the bottom sheet 40 is heated, it will begin to contract, stretching the top face sheet 30 from zero to eight percent, and the bottom face sheet 40, which is now the heated one, will go back to zero percent strain. Therefore in the instant embodiment, the initial four percent strain does not occur as an end state. That flat neutral position, at which the process started, does not occur any more as a fixed position in this particular embodiment. The face sheets 30, 40 pass through that four percent or straight shape in reversing between its end states. The neutral position would no longer be a fixed configuration for the actuator 1.

However, as will be discussed below, intermediate positions are possible. It should further be noted that there is actually not a distinct temperature, not a unique temperature, e.g., 98 degrees, at which all of the martinsite completely converts to austenite. Rather, there's actually a range of temperatures at which at a lower temperature, referred to as the austenite-start $A_s$ temperature, at which the first regions within the alloy begin to experience the phase transformation. But 100 percent conversion will not be realized until it gets all the way from austenite-start $A_s$ to austenite-finish $A_f$, which temperatures may be 25° C. apart from one another, for example. Therefore, if only fifty percent conversion occurs, then the faces will only produce a fifty percent of the strain reversal. Consequently, in an alternative embodiment, intermediate configurations and shapes can be obtained and held accordingly. That is, by invoking only partial conversion of the martinsite to austenite phase transformation. This alternative embodiment would provide a more degreed control of the shape change or morphing.

Figure 4:
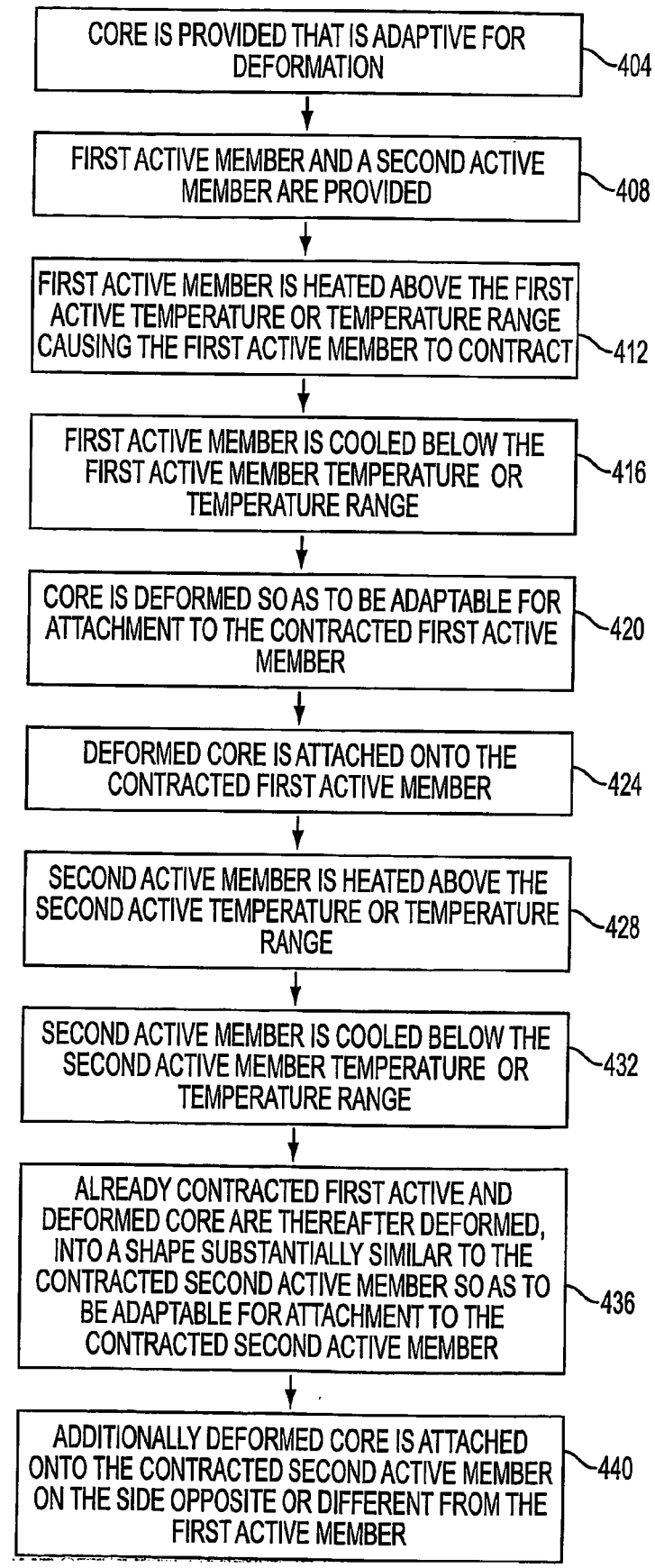

Turning to FIGS. 4 and 6, FIG. 4 illustrates an alternative embodiment of the present invention method for manufacturing the reversible shape memory multifunctional structure and FIG. 6 schematically illustrates the structure produced therefrom. Although these steps are illustrated in a particular order in the flowchart of FIG. 4, the steps may be performed in various orders and/or with modified procedures or structures suitable to a given application. In a step 404, a deformable core is provide as shown in FIG. 6A, which is intended for illustrative and non-limiting purposes only. Other core types can be utilized as well. In a step 408, first active member 30 and a second active member 40 is provided. The first and second active members 30, 40 are adapted to contract if exposed to a first transition temperature or temperature range and second temperature or temperature range (i.e. stimulated), respectively. In step 412, the first active member 30 is heated above the first active temperature or temperature range causing the first active member 30 to contract. For instance, in a substantially concave like manner or shape as shown in FIG. 6B. In step 416, the first active member 30 is cooled below the first active temperature or temperature range, while remaining in its contracted position or shortened state. In step 420, the core 20 is deformed so as to be adaptable for attachment to the contracted first active member 30, as also shown if FIG. 6B. In step 424, the deformed core is attached onto the contracted first active member 30, as shown in FIG. 6C. In step 428, the second active member 40 is heated above the second active temperature range causing the second active member to contract or shorten. For instance, in a substantially concave like manner or shape as shown in FIG. 6D. In a step 432, the second active member 40 is cooled wherein the second active member 40 remains in contracted position or shortened state (i.e., non-stimulated). In step 436, the already contracted first active member 30 and deformed core 20 are thereafter deformed into a shape substantially similar to the contracted second active member 40 so as to be adaptable for attachment to the contracted second active member 40, as shown in FIG. 6E. In step 440, the additionally deformed core 20 is attached onto the contracted second active member 440 on a side opposite or different from the first active member 30.

Sill referring to FIGS. 4 and 6, a suggested alternative embodiment to be followed in manufacturing the reversible SMA 1 is further provided. First, the core 20 must be prepared, which satisfies the performance criteria stated above (i.e. adequate compressive strength and stiffness, low bending stiffness). The core 20 is then elastically deformed into one of the fully actuated configurations (shapes) and the first face 30 sheet attached, as shown in FIGS. 6A-6C. This face sheet 20 must be in the fully austenitized condition, as though it had just been heated to the austenite finish $A_f$ temperature. Next, the core plus first face sheet is deformed into the reversed fully actuated configuration (or shape), and the second face sheet is attached, as shown in FIGS. 6D-6F. As similarly required for the first face 30, this SMA sheet 40 must also be in the full austenite condition when attached. Care must be taken when attaching the second face sheet 40 that the first face sheet 30 does not become heated to near the austenite start temperature, which is typically below around 100 degrees C. It should be noted that the above steps are illustrative and that various sequences may be provided.

Still yet referring to FIGS. 4 and 6, this approach to manufacturing does not pre strain the face sheets (unlike the method illustrated in FIGS. 1 and 3). Rather, a first face sheet 30 is heated so that there is in an austenitic condition and the core is required to be bent for attachment capability, to this shortened first face sheet 30. With the first face sheet thusly attached, the core 20 and first face sheet 30 is physically deformed so that the first attached face sheet is now stretched to perhaps the limit of it's shape memory ability, for example eight percent or other desired level. The second face sheet 40, which is in the austenitic condition can be attached to the core 20. Thereafter, the first face sheet 30 can again be heated to initiate the reversible actuation sequence, and repeated as desired by alternate heating of the two face sheets.

The present invention multifunctional structure 1, e.g., sandwich panel or the like, as illustrated throughout this document, is capable of fully reversible (cyclic) shape changes and has the ability to perform useful work. The panel or structure 1 combines low weight per unit area of panel (or per unit length if applied to a beam), low cost, and ease of fabrication with high strength and elastic stiffness, and the ability to change shape and/or act as an actuator. The basis for the sandwich panel/beam design is a lightweight truss or foam core combined with shape memory alloy face sheets or other shape memory materials.

In general, the core 20 may be of any material (polymer, metal or ceramic), but must satisfy several property constraints:

1) the core must have sufficient stiffness and strength in compression (both in-plane and through-thickness directions) and in shear (in-plane) such that it does not deform excessively as a result of forces applied during face sheet activation (i.e., the temperature-driven phase transformation (or stimulus driven) which occurs when the active face sheets 30, 40 are heated). The core is required to be able to bear sufficient stress so that the inactive (unheated) face sheet can be deformed in tension as a result of the in-plane shrinkage of the active face. Thus thicker, or higher strength, face sheets require cores having greater compressive and shear strength.

2) the core should have a low resistance to out-of-plane bending (curvature).

3) the core must have an adequate elastic strain limit to avoid damage and failure during shape change, especially at or near joints connecting the core and face sheets.

The face sheets 30, 40 are constructed of a metallic shape memory alloy (may be a Ni—Ti, Cu—Al—Zn, or other SMA or shape memory materials (as would be appreciated by those skilled in the art) typically rolled into sheet form of the thickness required by the panel design. For example, the face sheets 30, 40 (or any designated active members) may be made from a material selected from the group consisting of Ni—Ti, Ni—Ti—V, Ni—Ti—Fe, Ni—Ti—Cu, Ni—Ti—C—, Ni—Ti—Cr, Ni—Ti—Nb, Ni—Ti—Pd, Ni—Ti—Fe, Cu—Zn—Al, Cu—Al—Ni and Fe—Mn—Si. Similarly, for example, the face sheets 30, 40 (or any designated active members) may be made from composites formed of one or more of a material selected from the group consisting of Ni—Ti, Ni—Ti—V, Ni—Ti—Fe, Ni—Ti—Cu, Ni—Ti—C—, Ni—Ti—Cr, Ni—Ti—Nb, Ni—Ti—Pd, Ni—Ti—Fe, Cu—Zn—Al, Cu—Al—Ni and Fe—Mn—Si. The principal requirement for the SMA face sheets is that they must undergo a temperature-driven martensite-austenite phase transformation at an appropriate temperature, and that as a result of this phase change, the face sheet undergoes a contraction (shrinkage) in the plane of the sheet.

Figure 7:
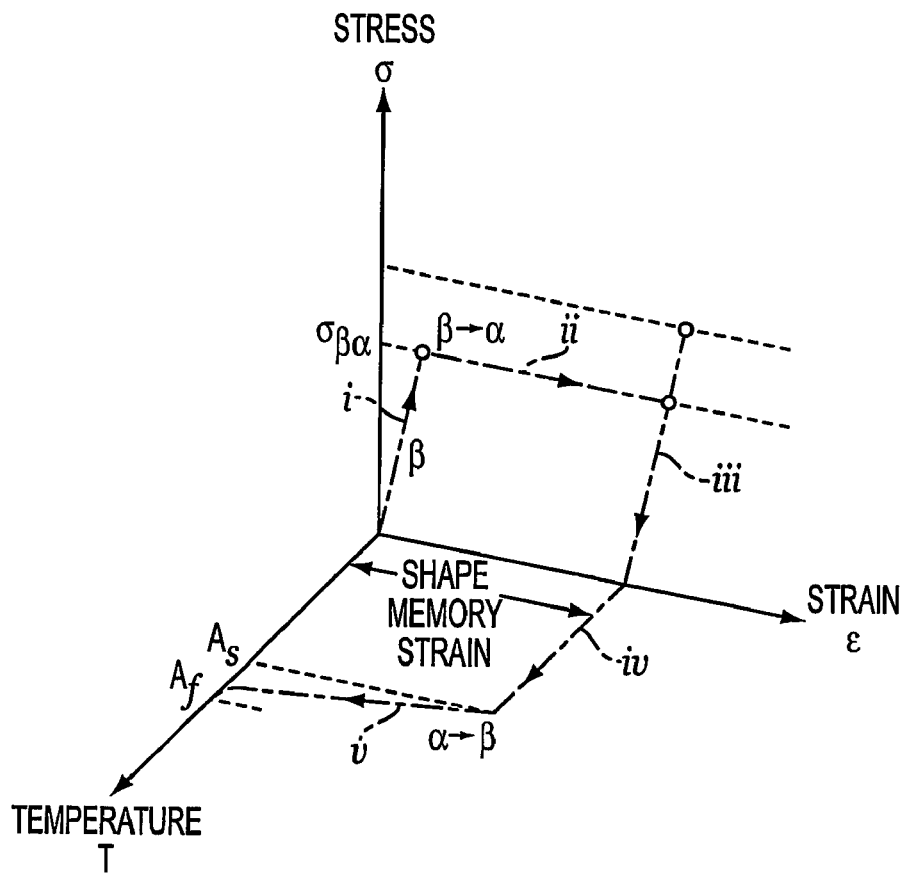
FIG. 7 illustrates the actuation sequence experienced by the SMA face sheets.

FIG. 7 illustrates the actuation sequence experienced by the SMA face sheets 30, 40 during one complete actuation cycle, as designated by the roman numerals, i-v. Consider the inactive face sheet as the opposite face is activated, i.e. heated: at low temperature (e.g. ambient temperature), the inactive SMA face is loaded (e.g. in tension) by the contraction of the opposite face; initially, the deformation is elastic, but the inactive face begins to deform permanently (inelastic deformation) when the applied stress reaches the transformation stress, $\sigma_{\alpha\beta}$. At this stress, the parent austenite phase deforms by the formation of martensite (in contrast to the usual method of inelastic deformation by the generation and motion of dislocations). The strain that accumulates during this period of deformation at constant stress is completely reversible provided that the maximum shape memory strain (dependent on the alloy and its processing history) is not exceeded. On unloading (path segment iii, still at low or ambient temperature), the martensite and the accumulated deformation remains. Next, this (inactive) face sheet becomes the active (heated) face; upon heating to the austenite start temperature ($A_s$), the martensite phase begins spontaneously to revert back to the more stable austenite (β phase), resulting in recovery of the shape memory strain accumulated at low temperature. The reverse transformation (α to β) is completed when the temperature reaches the austenite finish temperature ($A_f$). At this point, the actuator panel has experienced one complete actuation cycle.

Any through-thickness shape memory strain is incidental. The shape change may also be anisotropic, preferably with the maximum change in dimension lying in the plane of the maximum desired curvature. The alloy composition typically controls the phase transformation temperature and may therefore be chosen to provide a transformation temperature most suitable for the intended application. The shape memory performance of the alloy (achievable strain, hysteresis, etc.) may be controlled by the thermo-mechanical treatment and is chosen such that performance is optimized for the intended application.

Figure 8A:
FIGS. 8A-8C schematically represent various attachment types for attaching the SMA face sheets.
Figure 8B:
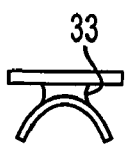
Figure 8C:
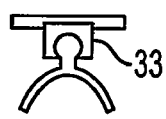

Turning to FIGS. 8A-8C, the SMA face sheets 30, 40 may be attached to the truss or foam core 20 or any other desired type core using the following: adhesives or metallurgical/chemical bonding, as shown in FIG. 8B; mechanical fasteners (rivets, screws, bolts/nuts, etc.), as shown in FIG. 8A; ball and socket; as shown in FIG. 8C, mortise and tenon, or any other device. However, the attachment means must satisfy several performance constraints:

1) the joint/attachment must provide adequate shear strength to avoid failure of the joint during actuation.

2) the joint must provide adequate compliance and/or rotational mobility so as to avoid excessive stresses arising in the joints during actuation, and subsequent failure.

3) preferably, the joint should be low cost and permit ease of manufacture.

In some of the various embodiments described herein, the face sheets are provided with a means of heating to a temperature sufficient to achieve the martensite-austenite phase transformation and at a rate deemed adequate for the intended application. Heating or stimulation may be achieved by direct resistance (Joule) heating of the SMA face sheet (i.e. by the attachment of suitable electrical contacts 32, 42 and the passage of current through the face sheet), by resistance heating of a conductor attached to, or located within the face sheet, by the use of a heated fluid or gas, by radiative means (e.g. Xenon lamp, laser, etc.), or other alternative approaches as appreciated by those skilled in the art. Other stimulation may eventually include electric, magnetic, electromagnetic, or perhaps sound fields.

Some of the products and services of which the present invention can be implemented includes, but is not limited thereto, 1) shape-changing wing (mission adaptable wing), propeller, blade or hydrofoil, 2) flapping fin (such as might be used to propel an undersea robotic vehicle), 3) load-bearing beams or panels which can also provide actuation, 4) deployable panelized space frames, 5) thermally activated load-bearing sensor, 6) medical devices, such as stents, 7) heat sensing valves, 8) robotic manipulators 9) undersea pipeline couplings, and 10) membrane actuators. The patents listed below are illustrative applications for the present invention apparatus, method of using, and method of manufacturing, and are hereby incorporated by reference herein in their entirety.

| | |
|---|---|
| 4,806,815 | Honma |
| 4,864,824 | Gabriel, et al. |
| 4,881,981 | Thomas, et al. |
| 5,419,788 | Thomas, et al. |
| 5,442,914 | Otsuka |
| 5,536,126 | Gross |
| 5,558,304 | Adams |
| 5,594,330 | Jacobsen |
| 5,641,955 | Bonniau, et al. |
| 5,662,294 | Maclean |
| 5,804,276 | Jacobs, et al. |
| 5,931,422 | Geiger, et al. |
| 5,941,249 | Maynard |
| 5,964,770 | Flomenblit, et al. |
| 6,004,330 | Middleman, et al. |

| | |
|---|---|
| 6,065,934 | Jacot, et al. |
| 6,131,531 | McCanna, et al. |
| 6,149,742 | Carpenter, et al. |
| 6,170,202 | Davoodi, et al. |
| 6,182,929 | Martin, et al. |
| 6,209,824 | Caton, et al. |
| 6,217,567 | Zadno-Azizi, et al. |
| 6,220,550 | McKillip, Jr. |
| 6,258,118 | Baum, et al. |
| 6,260,567 | Gruensfelder, et al. |
| 6,278,084 | Maynard |
| 6,299,613 | Ogilvie, et al. |
| 6,306,141 | Jervis |
| 6,318,070 | Rey, et al. |
| 6,345,792 | Bilanin, et al. |
| 6,348,067 | Baum, et al. |
| 6,384,707 | Minners |
| 6,395,018 | Castaneda |
| 6,402,906 | Pichulo |
| 6,409,749 | Maynard |
| 6,419,358 | Schetky, et al. |
| 6,422,010 | Julien |
| 6,425,343 | Akers, et al. |
| 6,425,829 | Julien |
| 6,427,712 | Ashurst |
| 6,427,948 | Campbell |
| 6,432,134 | Anson, et al. |

Provided below will be an additional discussion regarding various embodiments of the core of the present invention multifunctional memory structure. Once again, one of the advantages of the present invention is the core design and properties. Although the core itself is an inactive material it is important because it acts to ensure that opposing active elements (e.g. the SMA face sheets) experience strain in opposite directions (one in extension and the other in contraction). If one of the face sheets (active members) is heated so that the shape memory alloy (shape memory material) reverts to its high temperature shape (stimulated state), the design of the core ensures that the opposite face sheet, which is purposely unheated (un-stimulated), i.e., it's below the characteristic temperature (or stimulation), will be deformed so that martensite is created as it is being deformed.

When the face sheet has the martensitic state, that face sheet can, upon subsequent heating, change its phase (and thereby its shape) to austenite. So it is important that the inactive face sheet is deformed in the opposite sense to that of the active face sheet, i.e., the one that's being heated. In essence, the core insures a type of "logic circuit" wherein if one of the face sheets is austenite, then the other one must be martinsite. The logic, does not allow both face sheets in the same phase. The various face sheets or portions of the various face sheets can switch back and forth, but the core's design guarantees that not both of the face sheets or opposite portions of the face sheet will have the same phase. Thus, both face sheets typically shall not be fully heated or stimulated at the same time.

Continuing with further discussion of various embodiments of the present invention core, the core provides a lightweight, cellular truss structure. It can be constructed of various materials as long as it doesn't deform permanently when the actuator is functioning (i.e., wherein, the face sheets or portions thereof are contracting and extending). One of the important attributes of the design of the core is a low resistance to bending in the absence of attached face sheets. Secondly, it has to have a large resistance to in-plane shear deformation. The core must have a large resistance to that shear stress, because it has to be able to deform the low temperature face sheet when the active face sheet is reverting to its high temperature state. It must be able to transmit stress to the inactive (low temperature) face via shear stress sufficient to overcome the resistance of the inactive face sheet to deformation.

Figure 9A:
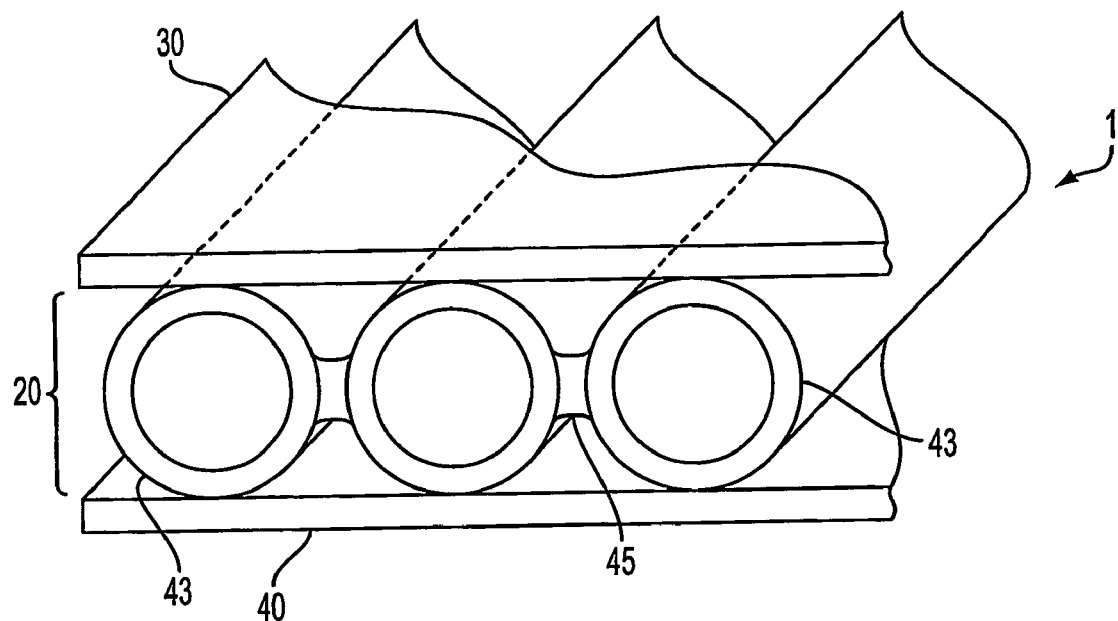
FIGS. 9A and 9B show a schematic representation of non-limiting examples—partial cut away view—of a cylinder chain embodiment and legs and pivot pin embodiment for the core, respectively.

According to the design criteria discussed throughout, other core designs of the present invention will be discussed immediately below. Referring to FIG. 9A, there is schematically illustrated a multifunctional shape memory structure 1 having a core 20 joined or boned to the first and second active members 30, 40, wherein the core 20 comprises a row of individual cylinders 43 bonded or joined together. A row of thin walled tubes or cylinders are attached together with a suitable attachment/bonding/joining means 45, side by side so to form a chain. This is another example of a structure that is easy to bend yet can withstand high shear stress. It should be noted that this core configuration does not have a center sheet (as previously discussed with the corrugated layers embodiment). Referring to the corrugated layers embodiment, there is provided a center sheet 24 functioning as the neutral axis of the beam. The neutral axis of the beam does not experience high stresses during the bending operation or function. Albeit, the bonds of the corrugated layers that attached to the face sheet will experience some stresses during bending. However, turning to the instant cylinder design, because the cylinders 43 are very close to the central axis, the deformation and stresses incurred during bending are quite small. This is also a reason why the cylinders have a low resistance to bending.

Figure 9B:
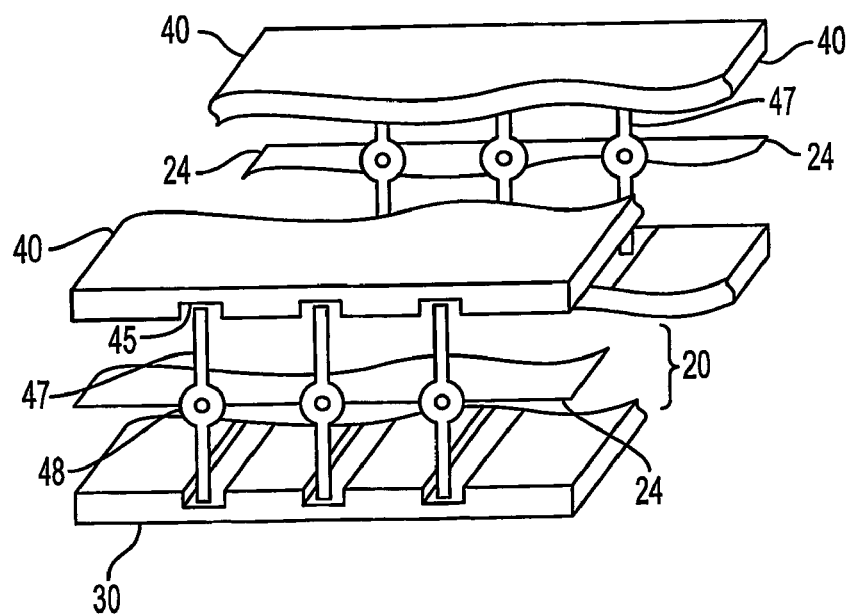

FIG. 9B schematically illustrates another embodiment of the multifunctional shape memory structure 1 having a core 20, wherein the core comprises multiple legs 47 and pivot pins 48 (or other available rotational and translation means known to those skilled in the art) at the neutral axis of the beam. The legs 47 may be movably attached to the active members 30, 40, for example, using notches 49 (or other available attachment means known to those skilled in the art) therein to allow for translation side to side to accommodate the contraction and expansion.

Figure 10:
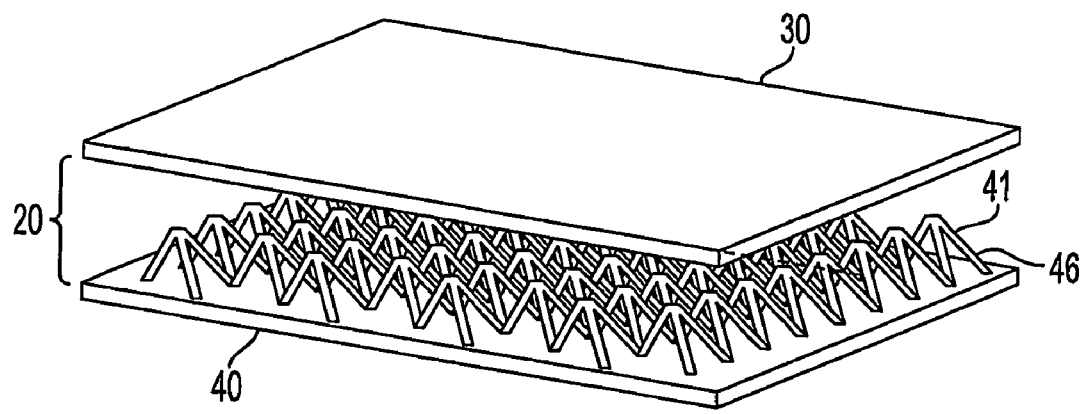
FIG. 10 shows a schematic representation of a non-limiting example of a three-dimensional space-filling array for the core.
Figure 11A:
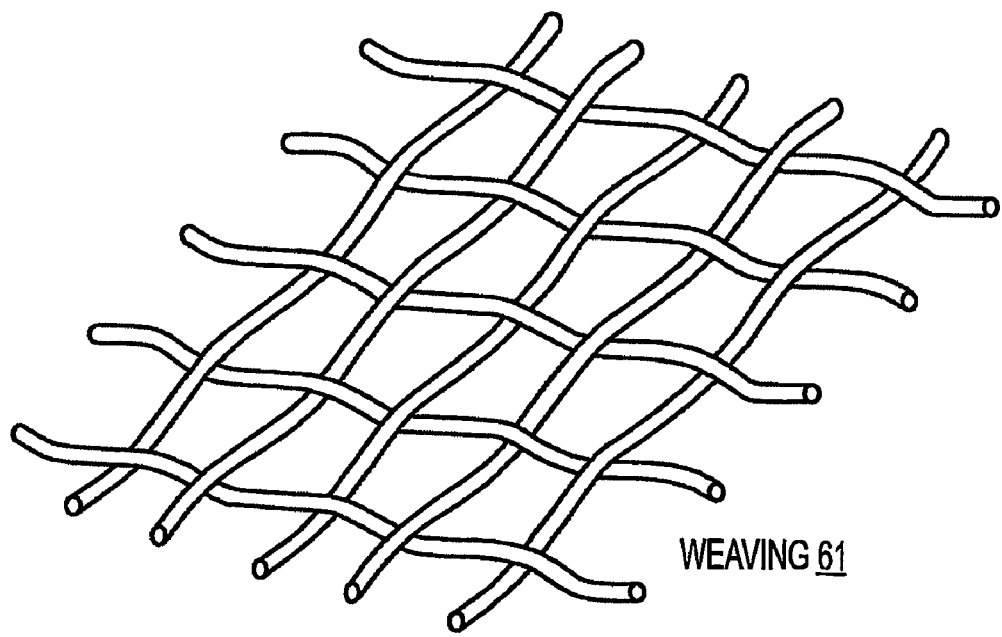
Figure 11B:
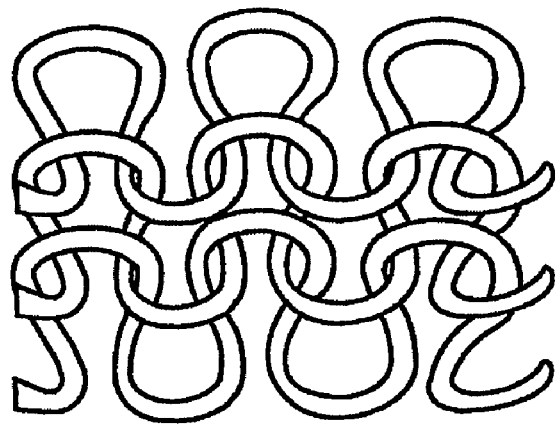
Figure 11C:
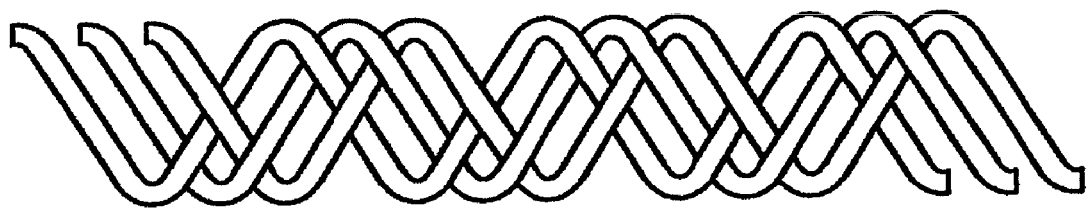

As shown in FIG. 10, according to the design criteria discussed throughout, other core designs of the present invention are provided. As shown in co-pending and co-assigned PCT International Application No. PCT/US02/17942, entitled "Multifunctional Periodic Cellular Solids And The Method Of Making Thereof," filed on Jun. 6, 2002, of which is hereby incorporated by reference herein in its entirety—and now provide with the present invention another way of forming the core 20 that includes a core that is comprised of three-dimensional space filling layers having an array of out-of-plane truss units 41. The out-of-plane truss units 41 may be a variety of shapes including tetrahedral, pyramidal, Kagome, combinations thereof and other non-limiting arrangements. The out-of-plane truss units 41 have a hollow or solid leg members 46, for example, but not limited thereto.

As shown in FIGS. 11A-11E, according to the design criteria discussed throughout, other core designs of the present invention are provided. As shown in co-pending and co-assigned PCT International Application No. PCT/US01/17363, entitled "Multifunctional Periodic Cellular Solids And The Method Of Making Thereof," filed on May 29, 2001, of which is hereby incorporated by reference herein in its entirety—and now provide with the present invention another way of forming the core that includes a core that is comprised of textile layers with a center sheet disposed between adjacent said textile layers, however, alternatively, the center sheet may be omitted. In addition to woven textile arrays, various suitable materials may be used. For example, referring to FIGS. 11A-11E, there are some non-limiting examples of woven 61, knitted 62, braided 63, triaxial 64, and biaxial 65, pre-crimped quasi-triaxial 66, 3-D braid textile 67, 3-D multi-ply weave 68, 3-D triaxial weave 69, 3-D multi-axial weave 70, 3-D 'H' or 'I' beam 71, 3-D honey-comb type 72 configurations, respectively, that can be used in arrays. Finally, other textile type classifications may be implemented as shown in the schematic views compiled in FIG. 11.

Metals, ceramics, glasses, polymers, composites and even semiconductors can all be utilized for the various core materials, as well as for the other components of the present invention device.

In addition, according to the design criteria discussed throughout, other core designs of the present invention are provided. As shown in co-pending and co-assigned PCT International Application No. PCT/US01/22266, entitled "Heat Exchange Foam," filed on Jul. 16, 2001, of which is hereby incorporated by reference herein in its entirety—and now provide with the present invention another way of forming the core that includes a core that is comprised of an open cell having solid or hollow ligaments.

Provided below will be an additional discussion regarding various applications of the present invention multifunctional memory structure. In no manner is this discussion intended to be an exhaustive account thereof. The fact that the present invention actuators are capable of large shape changes, while resisting reasonably large resistance forces, various opportunities and applications arise. Some applications include for instance, any aerodynamic surface that has to be controlled or any undersea vehicle, whether its sub or supersonic. These and other applications would benefit from, among other things, the actuators shape changing elements. Conventionally, the actuation is done by means of hydraulically or pneumatically controlled actuator elements that are in someway hinged or allowed to pivot. However, these conventional actuators have moving parts which exhibit frictional energy losses, have limited control in the sense that they generally involve flat surfaces that are being rotated about pivot points or axes.

Whereas in the present invention technology, the multifunctional surfaces have a much greater degree of shape control actuation. With the present invention, the flat surface is not just able to be elevated, but rather the shape of the surface can be changed or altered in a number of dynamic and versatile ways. For instance, the present invention provides the changes to the movable surfaces: inflection points, changes from concave up to change to concave down, cylindrical curvatures, compound cylindrical curvatures, and spherical curvatures. Virtually any desirable shape is achievable and moreover these controlled shape changes are cyclical and reversible.

There are other applications such as wind turbines, gas turbines, reflecting telescopes, light collecting arrays, where the shape of a surface needs to be controlled in some complicated way in order to optimize the performance of the device, whether light gathering, deflection, collection, etc.

Another area of use and manufacture of the present invention involves selectively heating regions of the face sheets. These would be the regions of the face sheets that are located between the attachment points where the face sheet attaches to the core. At that region where the face sheet is attached to the core, there may not be shape memory invoked there, and at times it may intentionally not be invoked. Instead, the shape memory effect, is invoked only in those regions of shape memory alloy that are located between the attachment points (alternatively, full exploitation of the shape memory effect for full actuation on the whole face may be invoked). Instead of heating the whole face sheet at once, just those elements or areas between the attachment points are heated so as to provide a finer degree of control. The face sheet portion that is at low temperature and generally opposite (i.e. the low temperature face portion that is directly opposite and which can be considered the low temperature counterpart of the element that is currently being activated) is the face sheet undergoing intentional stretching. It follows that the next element to be activated will be the face sheet portion required to reverse the previous actuation experienced.

A computer or programmable controller is connected or in communication with the face sheets so as to selectively—either in a simple or complex way—activate certain elements of one face sheet or another in order to achieve arbitrary shapes, that again are fully reversible, cyclical, and controllable.

For example, the operator, computer, or programmable controller can instigate a first heated region that moves along the top face sheet and a second heated region that is moving along the bottom face sheet, and which is out of phase with the heated region in the top sheet. As result, a ripple effect or a sine wave effect could be induced to move along the beam or panel. In application, this ripple motion would provide a propulsion effect for an undersea actuator in the manner of a manta ray. The propulsion would avoid or minimize cavitation, acoustic noise, have no moving parts, and no friction.

Moreover, for example, the alloy can be selected in such a fashion so as to get the temperature range where the phase transformation occurs to nearly match the undersea environment (or ambient temperature). As a result, very little energy would be needed to achieve actuation and transformation so as to allow the device to oscillate only a few degrees about the undersea temperature (ambient temperature).

Figure 12:
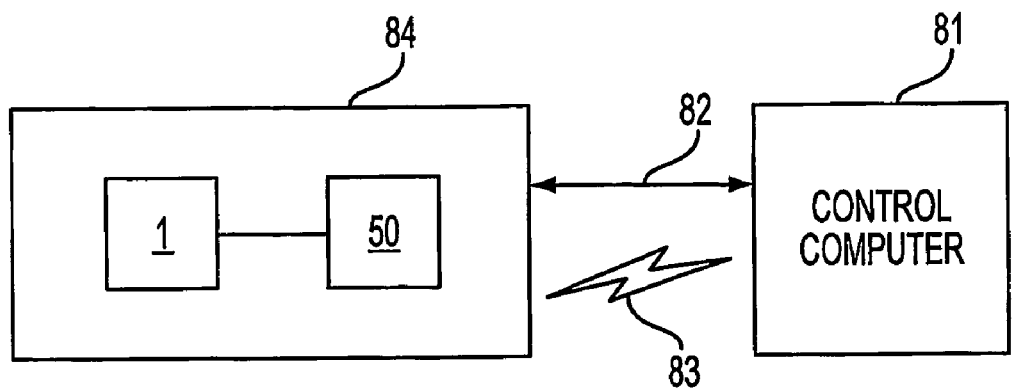
FIG. 12 is a schematic illustration of utilizing the reversible shape memory multifunctional structure for controlling an air craft, i.e. wing controls.

FIG. 12 is a schematic illustration of utilizing the reversible shape memory multifunctional structure for controlling an air craft, i.e. wing controls. FIG. 12 is a simplified block diagram of the control circuit wherein the present invention is utilized to for attitude control of an aircraft by means of controlling the surfaces of the air craft's wing 84 or propeller. A control system such as a computer 81 (or programmable controller) is in communication via wire transmission 82 or wireless transmission 83 with the structure 1 forming a part of the air craft wing 84. See U.S. Pat. No. 5,662,294 to Maclean et al., U.S. Pat. No. 6,138,604 and U.S. Pat. No. 6,182,929 to Martin et al., of which are hereby incorporated by reference herein.

Figure 13:
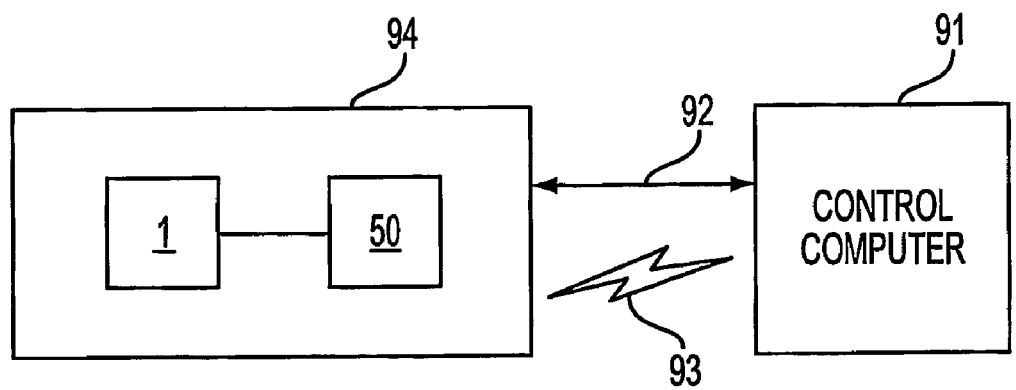
FIG. 13 is a schematic illustration of utilizing the reversible shape memory multifunctional structure for controlling a water craft or submarine, i.e. propulsion controls.

FIG. 13 is a schematic illustration of utilizing the reversible shape memory multifunctional structure for controlling a water craft or submarine, i.e. propulsion controls. FIG. 13 is a simplified block diagram of the control circuit wherein the present invention is utilized to for attitude control of a watercraft (e.g. submarine) by means of controlling the surfaces of the watercraft's propulsion system 94. A control system such as a computer 91 (or programmable controller) is in communication via wire transmission 92 or wireless transmission 93 with the structure 1 forming a part of the propulsion system 94. See U.S. Pat. No. 5,934,952 to Scanlon, U.S. Pat. No. 6,138,604 to Anderson, et al., and U.S. Pat. No. 6,293,090 to Olson, of which are hereby incorporated by reference herein. Moreover, other patents also incorporated by reference include: U.S. Pat. No. 4,129,089 to Paidoussis, U.S. Pat. No. 5,242,321 to Gil, U.S. Pat. No. 5,746,631 to McCarthy, U.S. Pat. No. 6,146,224 to McCarthy, U.S. Pat. No. 6,371,821 to McCarthy, and U.S. Pat. No. 6,417,597 to Jacobsen, et al.

An advantage of the present invention is that it provides a reversible shape memory structure have an inactive truss which becomes the core of a beam or panel, for example, whose surfaces or face sheets are made out of the active or shape memory alloy material in order to create a structural load bearing actuator or device that is capable of cyclic, fully reversible shape change. Not only can the present invention actuator or device change its shape in a fully reversible cyclic way, but it has the ability to act against significant forces while doing that. So the present invention actuator or device is not only a shape changing structure, but it is also a load bearing shape changing structure.

Another advantage of the present invention is that it provides a reversible shape memory structure that has a way of sensing or responding to some stimulus or change in its environment as well as satisfy structural demands of the given application with minimal use of material and which are structurally efficient.

Further, the present invention panel actuators offer advantages over competing concepts (e.g., conventional pneumatic or hydraulic actuated structures). The actuating forces and displacements (the ability to perform a large amount of useful work during actuation) of the present invention are greater than for piezoelectric materials and for those undergoing thermal expansion and contraction. The present invention panel actuators are cost effective to manufacture, light weight and have the ability to be made as an integral part of the structural panel or beam.

In summary, the present invention provides a multifunctional panel concept, and method of manufacturing the same, in which a lightweight structural sandwich panel is able to undergo a reversible change in shape without any external or bias forces required to complete the full cycle of shape change. The shape-changing structural panel can be used as a wing or fin, which can alter its aerodynamic or hydrodynamic properties, or as an actuator, which can be used to perform useful work. The shape change is effected by the face sheets, which are integral shape memory alloy (SMA) actuators or other shape memory materials. Furthermore, the actuator panel achieves a fully reversible shape change using the one-way shape memory effect only. As a result of a unique core design, among other things, the sandwich beam or panel is able to perform fully reversible cyclic shape changes by alternately heating one face sheet and then the other. The performance of the sandwich panel, in terms of available power, actuating frequency, peak load bearing capacity, stiffness, weight, cost, etc., can be optimized by proper selection of face sheet alloy, thickness, overall core thickness, core member thickness and length, and the design of the joint connecting core member and face sheet.

Finally, advantages associated with the present invention are the following, but not limited thereto, 1) conventional structural panels are not multifunctional and are unable to achieve a controlled shape change as compared to the present invention, 2) the present invention reversible actuator panel is relatively stiff, strong and lightweight, 3) conventional hydraulically and pneumatically actuated panel structures are heavy, bulky and require working with fluids or gases under pressure, whereas the present invention SMA (or other shape material) sandwich panel is thermally actuated, involves no fluids and is space efficient by having the face sheets act as integral actuators, 4) the present invention actuating sandwich panel is capable of generating large forces and displacements, 5) the present invention panel is capable of fully reversed (one-way) shape changes without the need for any type of bias spring or externally imposed restoring force, 6) the present invention panel can be constructed of materials (e.g., Ni—Ti alloy and stainless steel), which are resistant to many corrosive agents, are machinable and can be joined by welding or brazing, for example, 7) the present invention panel has no moving parts in its actuation, no losses due to friction and never needs lubrication, and 8) the present invention panels are amenable to low cost manufacturing methods.

The invention may be embodied in other specific forms without departing from the spirit or essential characteristics thereof. Of course, it should be understood that a wide range of changes and modifications can be made to the preferred embodiment described above. The foregoing embodiments are therefore to be considered in all respects illustrative rather than limiting of the invention described herein. Scope of the invention is thus indicated by the appended claims as read in light of the foregoing description, including all equivalents, and all changes which come within the meaning and range of equivalency of the claims are therefore intended to be embraced herein.

REFERENCES

The following references are hereby incorporated by reference herein in their entirety herein.

Loughlan, J. and Thompson, S. P., "Enhancing the post-buckling response of a composite panel structure utilizing shape memory alloy actuators—a smart structural concept", Comp. Struct. 51(1), 21-36 (2001).

Sun, J. Q., "An impedance study of curved sandwich trim panels driven by piezoelectric patch actuators", J. Sand. Struct. & Mater. 1(2), 128-146 (1999).

Scott, R. C. and Weisshaar, T. A., "Panel flutter suppression using adaptive material actuators", J. Aircr. 31(1), 213-222 (1994).

Zhong, Z. and Mei, C., "Control of large thermal deflection of surface panels for high speed flight vehicles using shape memory alloy", Cracow University of Technology, Thermal Stresses '99: Third International Congress on Thermal Stresses Proceedings (Poland), pp. 395-398 (1999).

Lu, T. J., Hutchinson, J. W. and Evans, A. G., "Optimal design of a flexural actuator", J. Mech. Phys. Solids 49 (2001), 2071-2093.

We claim:

1. A multifunctional member adapted for reversible structural deformation from a first shape to a second shape, the multifunctional member comprising:

a first active member, said first active member adapted to contract if exposed to a temperature above a first transition temperature range;

a second active member, said second active member adapted to contract if exposed to a temperature above a second transition temperature range;

at least one core member, wherein said first and second active members are connected to opposite sides of said core member;

at least one heat source operatively connected to said first and second active members to expose said first and second active members to said first and second temperatures, respectively;

wherein said first and second active members are operable to alter the shape of the multifunctional member between said first and second shapes, wherein:

said first active member contracts while above said first transition temperature range causing said at least one core member to bend out-of-plane and thereby causing said second active member to expand, whereby said multifunctional member assumes said first shape;

said second active member contracts while above said second transition temperature range causing said at least one core member to bend out-of-plane and thereby causing said first active member to expand, whereby said multifunctional member assumes said second shape;

wherein said multifunctional member retains each of said first and second shapes after exposure to said first and second temperatures by said at least one heat source has been stopped; and wherein said core is comprised of at least two corrugated layers with a center sheet disposed between adjacent said corrugated layers.

2. The multifunctional member of claim 1, wherein said first and second active members are alternatively exposed to first and second temperature transition ranges, respectively, the multifunctional member is adapted to perform fully reversible cyclic shape changes.

3. The multifunctional member of claim 1, wherein said first and second transition temperature ranges are between about 0 C. to about 170 C.

4. The multifunctional member of claim 1, wherein said first and second transition temperature ranges are between about 20 C. to about 120 C.

5. The multifunctional member of claim 1, wherein said first and second transition temperature ranges are about 50 C. to about 70 C.

6. The multifunctional member of claim 1, wherein said core is bonded to adjacent said corrugated layers, wherein said bond is at least one of brazing bonded, UV welding bonded, laser welding bonded, or diffusion welding bonded.

7. The multifunctional member of claim 1, wherein said first and second active members are made from a material selected from the group consisting of Ni—Ti, Ni—Ti—V, Ni—Ti—Fe, Ni—Ti—Cu, Ni—Ti—C—, Ni—Ti—Cr, Ni—Ti—Nb, Ni—Ti—Pd, Ni—Ti—Fe, Cu—Zn—Al, Cu—Al—Ni and Fe—Mn—Si.

8. The multifunctional member of claim 1, wherein said first and second active members are made from composites formed of one or more of a material selected from the group consisting of Ni—Ti, Ni—Ti—V, Ni—Ti—Fe, Ni—Ti—Cu, Ni—Ti—C—, Ni—Ti—Cr, Ni—Ti—Nb, Ni—Ti—Pd, Ni—Ti—Fe, Cu—Zn—Al, Cu—Al—Ni and Fe—Mn—Si.

9. The multifunctional member of claim 1, wherein said first and second active members are made of substantially planar surfaces that can be contracted or expanded.

10. The multifunctional member of claim 1, wherein said first and second active members are made from a shape comprised from a group consisting of rods, strips, and panels.

11. An air craft comprising:
at least one wing; and
wherein said multifunctional member of claim 1 is adapted to actuate said at least one wing of the aircraft.

12. A watercraft comprising:
at least one propulsion system; and
wherein said multifunctional member of claim 1 is adapted to actuate said at least one propulsion system of the watercraft.

* * * * *